(12) United States Patent  
Nakamura

(10) Patent No.: US 9,365,347 B2
(45) Date of Patent: Jun. 14, 2016

(54) TRANSFER DEVICE

(71) Applicant: MURATA MACHINERY, LTD., Kyoto-shi, Kyoto (JP)

(72) Inventor: Akitoshi Nakamura, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 0 days.

(21) Appl. No.: 14/424,588

(22) PCT Filed: Aug. 22, 2013

(86) PCT No.: PCT/JP2013/072391
§ 371 (c)(1),
(2) Date: Feb. 27, 2015

(87) PCT Pub. No.: WO2014/038387
PCT Pub. Date: Mar. 13, 2014

(65) Prior Publication Data
US 2015/0210472 A1 Jul. 30, 2015

(30) Foreign Application Priority Data

Sep. 6, 2012 (JP) .................................. 2012-195968

(51) Int. Cl.
*B65G 1/04* (2006.01)
(52) U.S. Cl.
CPC ............ *B65G 1/0435* (2013.01); *B65G 1/0407* (2013.01); *B65G 1/0421* (2013.01)
(58) Field of Classification Search
CPC ... B65G 1/0435; B65G 1/0407; B65G 1/0421
See application file for complete search history.

(56) References Cited

U.S. PATENT DOCUMENTS 7,393,173 B2 * 7/2008 Mathys ................ B65G 1/0435
414/266
8,596,952 B2 * 12/2013 Wolkerstorfer ...... B65G 1/0435
414/280

(Continued)

FOREIGN PATENT DOCUMENTS

| CN | 102161434 A | 8/2011 |
| JP | 2012-071929 A | 4/2012 |
| WO | 2011/158422 A1 | 12/2011 |

OTHER PUBLICATIONS

English translation of Official Communication issued in corresponding International Application PCT/JP2013/072391, mailed on Mar. 19, 2015.

(Continued)

Primary Examiner — Kaitlin Joerger
(74) Attorney, Agent, or Firm — Keating & Bennett, LLP

(57) ABSTRACT

A transfer device includes a conveyor, a slide arm, hooks, and a controller. The conveyor can is configured to transport an article placed on a top surface thereof in the direction parallel or substantially parallel to the article transporting direction. The slide arm is configured to slide and move in the direction parallel or substantially parallel to the article transporting direction. The hooks are attached to the slide arm and are configured to move between action position protruding toward the article placed on the conveyor in a direction crossing a sliding direction of the slide arm and a retract position to avoid contact with the article placed on the conveyor. The controller controls the conveyor to transport the article in the direction opposite to the article transporting direction so that an end of the article in the opposite direction of the article transporting direction reaches a position adjacent to the hook, and then moves the slide arm in the article transporting direction.

8 Claims, 10 Drawing Sheets

(56) References Cited

U.S. PATENT DOCUMENTS

| | | | | |
|---|---|---|---|---|
| 8,740,542 | B2* | 6/2014 | Wolkerstorfer | B65G 1/0435 414/280 |
| 8,753,060 | B2* | 6/2014 | Ueda et al. | B65G 1/0421 198/346.2 |
| 2005/0095093 | A1* | 5/2005 | Hansl | B66F 9/141 414/277 |
| 2006/0245862 | A1* | 11/2006 | Hansl | B65G 1/0435 414/281 |
| 2011/0008138 | A1* | 1/2011 | Yamashita | B65G 1/0435 414/277 |
| 2011/0156332 | A1* | 6/2011 | Kishimoto | B65G 1/0407 269/56 |
| 2012/0099952 | A1* | 4/2012 | Koyama | B65G 1/0435 414/277 |
| 2015/0203295 | A1* | 7/2015 | Nakamura | B66F 9/07 414/274 |
| 2015/0259141 | A1* | 9/2015 | Yamada | B65G 1/0407 414/267 |
| 2015/0321845 | A1* | 11/2015 | Nakamura | B65G 1/0435 414/273 |

OTHER PUBLICATIONS

Official Communication issued in International Patent Application No. PCT/JP2013/072391, mailed on Nov. 19, 2013.

* cited by examiner

TRANSFER DEVICE

BACKGROUND OF THE INVENTION

1. Field of the Invention

The present invention relates to a transfer device configured to transfer an article in a stacker crane or a station of an automated transport system.

2. Description of the Related Art

The stacker crane includes the transfer device configured to transfer an article to and from a shelf disposed in an automatic warehouse. In addition, the station of the automated transport system is provided with the transfer device configured to transfer an article to and from a carrier.

As structures of the transfer device, there are a slide fork system in which the article is picked up and transferred by a fork, a suction system in which the article is sucked, held, and transferred, a pickup belt system in which the article is moved to slide and is transferred by a pickup belt, a clamp system in which the article is pinched and held at its both sides and is transferred, and a hook system in which an end of the article is engaged with a hook disposed on a tip of a slide arm so that the article is pushed or pulled and is transferred when the slide arm moves forward and backward.

For instance, there is proposed a transfer device provided with a hook supported in a rotatable manner on a tip of the slide arm (for example, see WO2011/158422).

In WO2011/158422, the hook disposed on the tip of the slide arm rotates with respect to the slide arm and hence can move between an action position contacting with the end of the article and a retract position not contacting with the article.

In an operation of transferring the article from the transfer device to the shelf, the transfer device sets the hook in the action position so as to contact with the end position of the article, and moves the slide arm forward toward the shelf so as to push the article to the shelf.

If the hook in the action position is moved at high speed so as to contact with the end position of the article, damage to the article may be caused. Therefore, an optical sensor is disposed adjacent to a position of the slide arm at which the hook is attached, and the arm is moved at low speed until the optical sensor detects the end position of the article.

In the transfer device described above, because the slide arm is moved at low speed until the hook reaches the contact position, there is a problem that the transfer process takes time.

SUMMARY OF THE INVENTION

Preferred embodiments of the present invention significantly reduces the transfer process time in the transfer device used for the stacker crane, the station of the automated transport system, or the like.

Hereinafter, a plurality of aspects of various preferred embodiments of the present invention will be described below. These aspects are capable of being arbitrarily combined as necessary or desired.

A transfer device according to an aspect of various preferred embodiments of the present invention includes a conveyor, a slide arm, a hook, and a controller. The conveyor is configured to transport an article placed on a top surface in parallel or substantially parallel to the article transporting direction. The slide arm is configured to slidably move in parallel or substantially parallel to the article transporting direction. The hook is attached to the slide arm and is configured to move between an action position protruding toward the article placed on the conveyor in a direction crossing a sliding direction of the slide arm and a retract position to avoid contact with the article placed on the conveyor. The controller is configured or programmed to control the conveyor to transport the article oppositely to the article transporting direction so that an end position on the opposite side in the article transporting direction reaches a position adjacent to the hook, and afterwards control the slide arm to move in the article transporting direction.

In this transfer device, when transporting the article, the conveyor carries the article oppositely to the article transporting direction in advance, so that the end position of the article contacts with the hook. Therefore, the slide arm is configured to move the article at high speed from the beginning, and hence it is possible to shorten the transfer process time.

Here, the controller is configured or programmed to control the conveyor to start to transport the article in the article transporting direction after the hook contacts with the end position of the article, simultaneously or after the movement of the slide arm starts.

In this case, the slide arm and the conveyor transport the article quickly and smoothly.

In addition, the transfer device preferably further includes an end detection sensor attached to the slide arm adjacent to the hook. The controller preferably is configured or programmed to determine whether or not the end position of the article on the opposite side in the article transporting direction has reached a position adjacent to the hook based on a detection signal of the end detection sensor.

In this case, it is reliably detected that the end position of the article has reached adjacent to the hook. As a result, it is possible to prevent damage to the article and to perform a transfer process very rapidly.

A transfer device according to another aspect of various preferred embodiments of the present invention includes a first conveyor and a second conveyor, a slide arm, a first hook and a second hook, a first end detection sensor and a second end detection sensor, and a controller. The first conveyor and the second conveyor are disposed in series in the article transporting direction and are capable of transporting articles placed on top surfaces in parallel or substantially parallel to the article transporting direction. The slide arm is capable of slide moving in parallel or substantially parallel to the article transporting direction. The first hook and the second hook are attached to the slide arm and configured to respectively move between an action position protruding toward the articles placed on the first conveyor and the second conveyor in a direction crossing a sliding direction of the slide arm and a retract position to avoid contact with the articles placed on the first conveyor and the second conveyor. The first end detection sensor and the second end detection sensor are attached to the slide arm and respectively detect end positions of the articles placed on the first conveyor and the second conveyor in the moving direction of the slide arm. The controller determines a state of the articles placed on the first conveyor and the second conveyor based on detection results of the first end detection sensor and the second end detection sensor, and controls the first conveyor and/or the second conveyor to transport the article oppositely to the article transporting direction based on the detection result so that the end position of the article placed on the first conveyor and/or the second conveyor on the opposite side in the article transporting direction reaches a position adjacent to the first hook and/or the second hook, and afterwards controls the slide arm to move in the article transporting direction.

Here, based on the detection results of the first end detection sensor and the second end detection sensor, the controller determines one of a plurality of states including the state where the article is not placed on the first conveyor or the second conveyor, the state where the article is placed on only one of the first conveyor and the second conveyor, the state where the articles are respectively placed on the first conveyor and the second conveyor, and the state where a large article is placed over the first conveyor and the second conveyor.

In addition, if it is determined that the state where the article is not placed on the first conveyor or the second conveyor, the controller is configured or programmed to finish the process of transporting the article. If it is determined that the state where the article is placed on only one of the first conveyor and the second conveyor, the controller sets the action position of the hook corresponding to one of the first conveyor and the second conveyor on which the article is placed, and controls the conveyor to transport the article oppositely to the article transporting direction so that the end position of the article placed on the conveyor on the opposite side in the article transporting direction reaches a position adjacent to the hook. If it is determined that the state where articles are respectively placed on the first conveyor and the second conveyor, the controller sets the first hook and the second hook in the action position, and controls the first conveyor and the second conveyor to transport the articles oppositely to the article transporting direction until the end positions of the articles placed on the first conveyor and the second conveyor on the opposite side in the article transporting direction respectively reach a position adjacent to the first hook and the second hook. If it is determined that the state where a large article is placed over the first conveyor and the second conveyor, the controller sets the action position of one of the first hook and the second hook positioned on the opposite side in the article transporting direction, and controls the first conveyor and the second conveyor to transport the article oppositely to the article transporting direction so that the end position on the opposite side in the article transporting direction reaches a position adjacent to the hook.

Further, the first end detection sensor and the second end detection sensor may be respectively attached adjacent to the first hook and the second hook of the slide arm, and the controller is configured or programmed to determine whether or not the end position of the article placed on the first conveyor and/or the second conveyor on the opposite side in the article transporting direction has contacted with the first hook and/or the second hook based on detection signals of the first end detection sensor and the second end detection sensor.

According to various preferred embodiments of the present invention, the transfer process time is significantly reduced in the transfer device used for the stacker crane or the station of the automated transport system.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3A shows a plan view in the case where a hook is in a retract position, and FIG. 3B shows a side view thereof.

DETAILED DESCRIPTION OF THE PREFERRED EMBODIMENTS

As a preferred embodiment of a transfer device of the present invention, a case where a transfer device is disposed in a stacker crane is exemplified and described.

Figure 1:
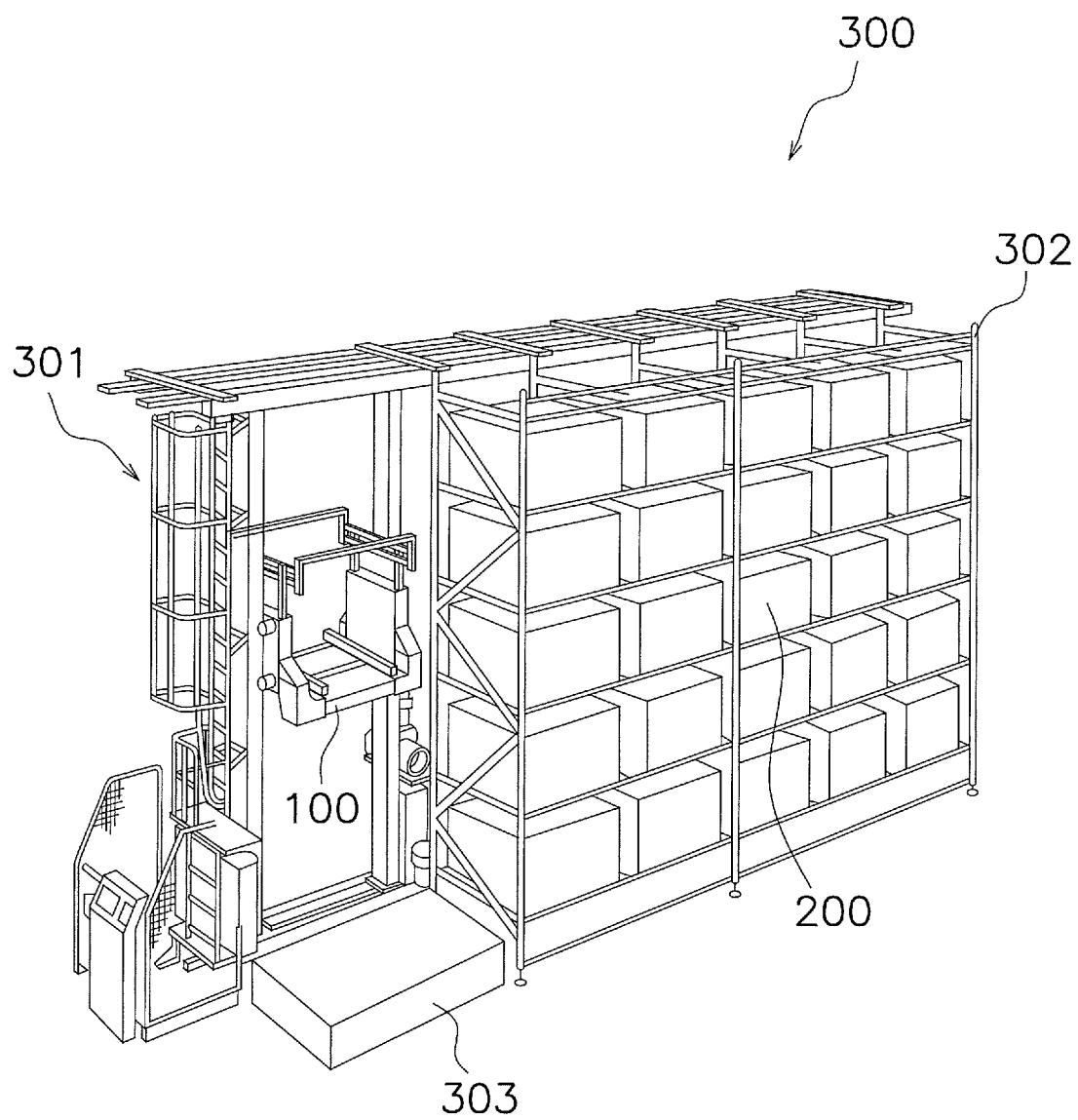
FIG. 1 is a perspective view showing a portion of an automatic warehouse provided with a stacker crane including a transfer device.

FIG. 1 is a perspective view showing a portion of an automatic warehouse provided with the stacker crane including the transfer device.

As shown in FIG. 1, an automatic warehouse 300 includes a stacker crane 301 capable of traveling to transport an article 200, and shelves 302 disposed on both sides of the traveling direction of the stacker crane 301.

The automatic warehouse 300 includes a station 303 configured to store and retrieve the article 200. The stacker crane 301 includes a transfer device 100. The stacker crane 301 transfers the article 200 transported onto the station 303 to the stacker crane 301 by the transfer device 100. In addition, the stacker crane 301 carries the article 200 onto a storage position on the shelf 302 and transfers the same to the corresponding shelf 302 by using the transfer device 100.

Similarly, the stacker crane 301 transfers the article 200 stored on the shelf 302 to the stacker crane 301 by using the transfer device 100 and carries the same to the station 303.

Figure 2:
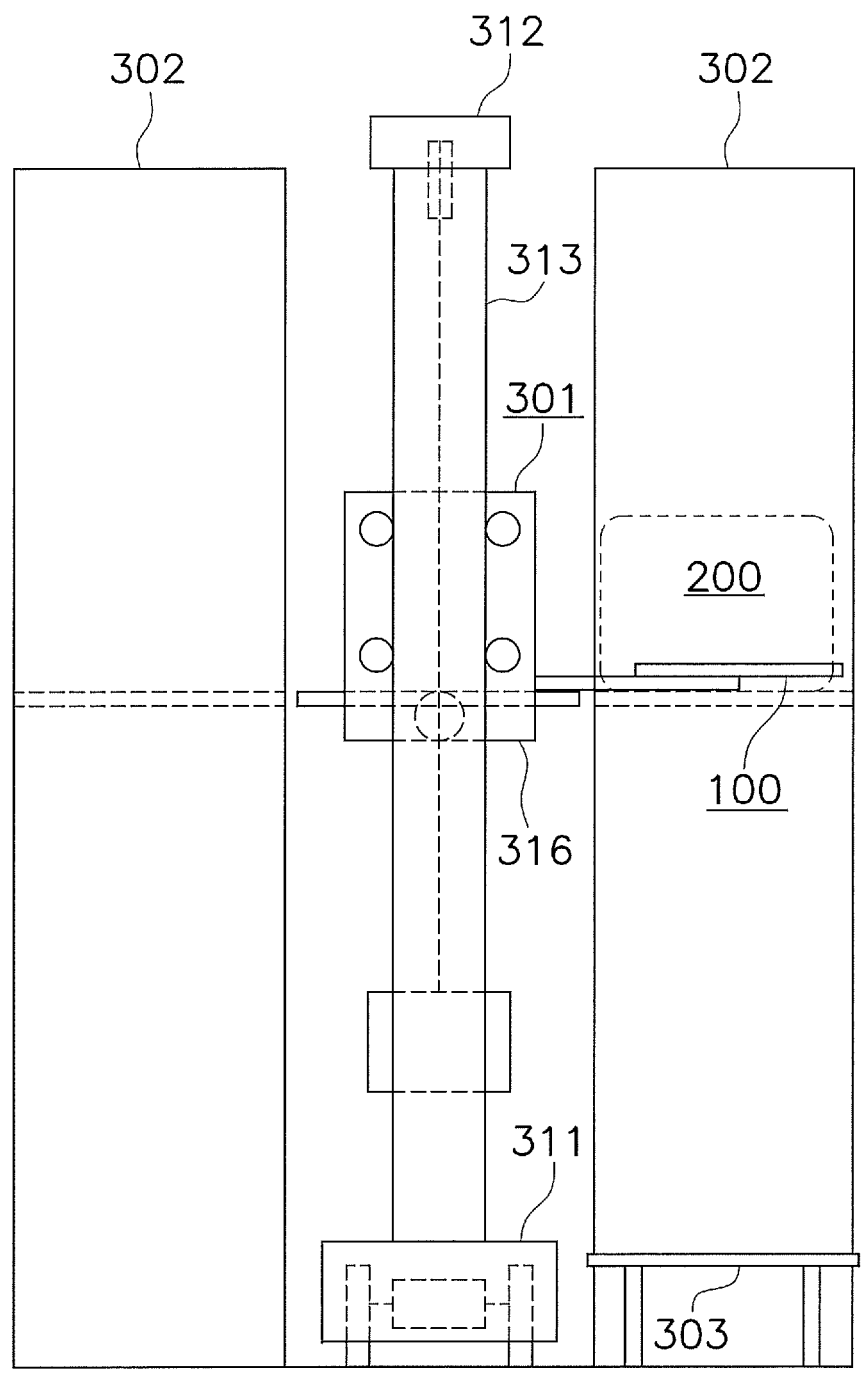
FIG. 2 is a side view showing schematically the automatic warehouse.

FIG. 2 is a side view schematically showing the automatic warehouse.

The stacker crane 301 includes a structure in which a lower cart 311 and an upper cart 312 are connected by a mast 313 so that an elevation table 316 is configured to move up and down along the mast 313.

The elevation table 316 is provided with the transfer device 100.

First Preferred Embodiment

Figure 3A:
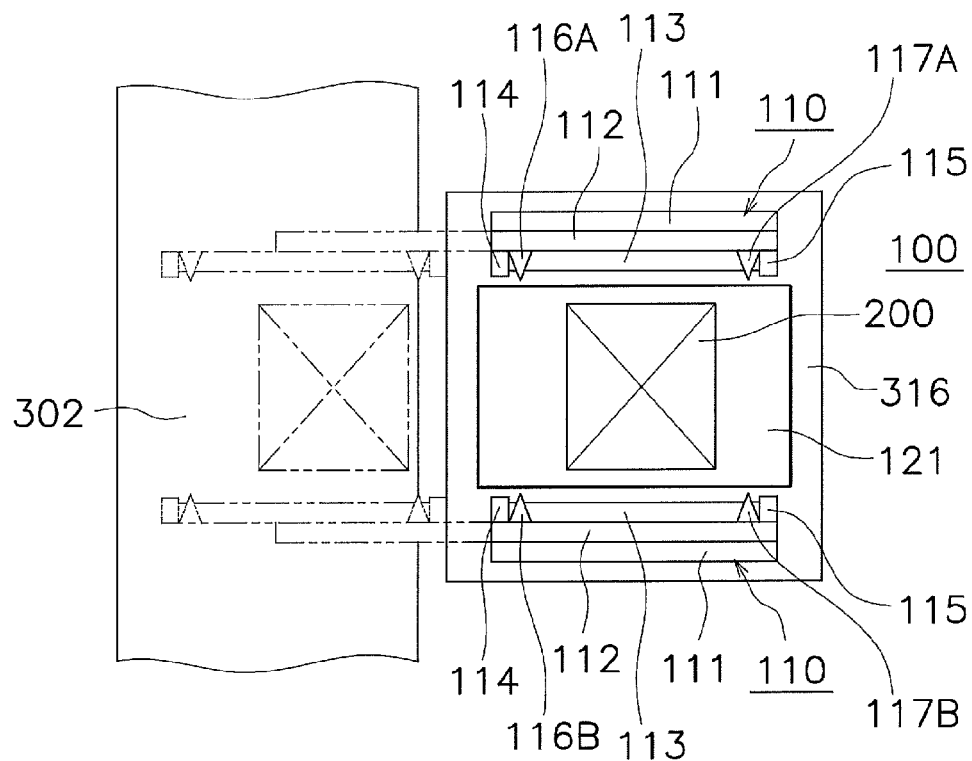
FIGS. 3A and 3B are explanatory diagrams of a transfer device 100 according to a first preferred embodiment of the present invention.
Figure 3B:
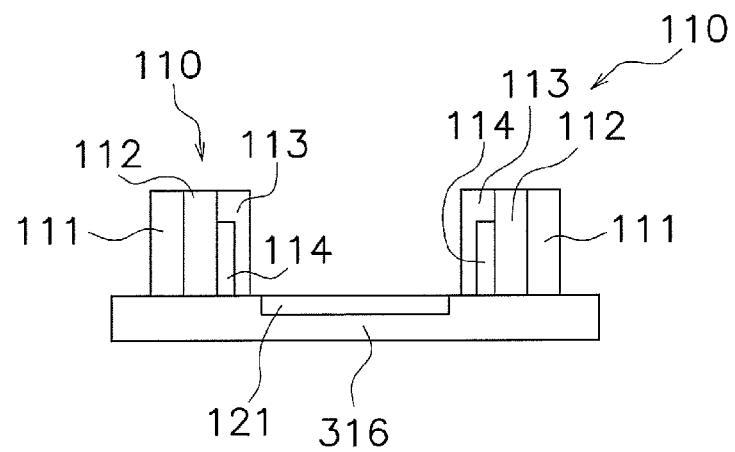
Figure 4A:
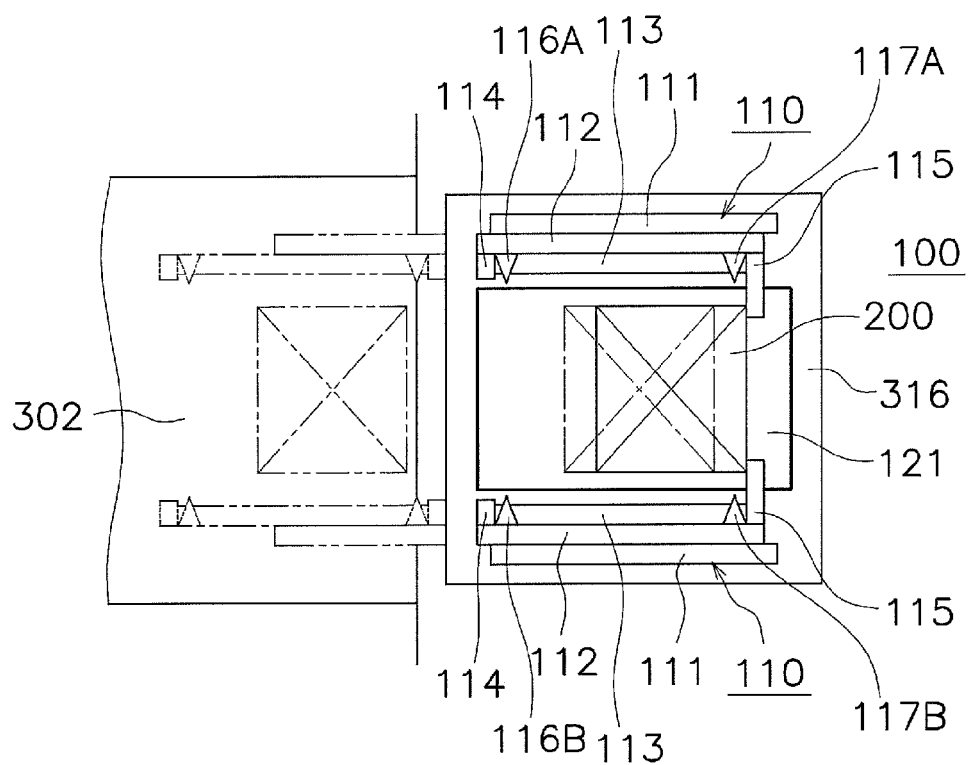
FIG. 4A is a plan view in the case where the hook is in an action position.
Figure 4B:
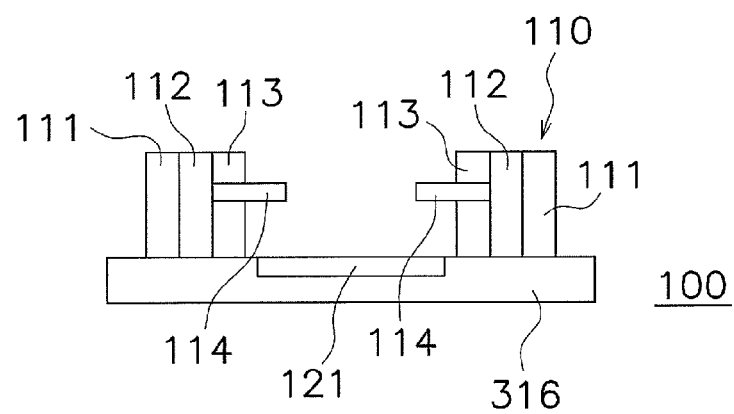
FIG. 4B is a side view thereof.

FIGS. 3A and 3B are explanatory diagrams of the transfer device 100 according to the first preferred embodiment of the present invention. FIG. 3A shows a plan view in the case where a hook is in a retract position, and FIG. 3B shows a side view thereof. FIGS. 4A and 4B are explanatory diagrams of the transfer device 100 according to the first preferred embodiment. FIG. 4A shows a plan view in the case where the hook is in an action position, and FIG. 4B is a side view thereof. Note that in FIG. 3A and FIG. 4A, the left and right direction is a first horizontal direction, and the up and down direction is a second horizontal direction.

The transfer device 100 (an example of the transfer device) is a device configured to transfer the article 200 (an example of the article) between the elevation table 316 and the shelf 302 and includes a pair of slide arms 110 (an example of the slide arms).

The pair of slide arms 110 are disposed with a space between them in the second horizontal direction. Each slide arm 110 includes a base arm 111, a middle arm 112, a top arm 113, a first hook 114, and a second hook 115.

The base arm 111 is secured to the elevation table 316. The middle arm 112 is supported by the base arm 111 in a slidable manner in the first horizontal direction, and supports the top arm 113 in a slidable manner in the first horizontal direction. When the middle arm 112 and the top arm 113 are moved to slide relative to the base arm 111, the top arm 113 is capable of being inserted into the shelves 302 on both sides.

The first hook 114 is attached to an end of the top arm 113 and is configured to move between the action position protruding toward the article 200 as shown in FIGS. 4A and 4B (an example of the action position) and the retract position not contacting with the article 200 as shown in FIGS. 3A and 3B (an example of the retract position).

For instance, the first hook 114 is attached to a rotation shaft disposed along a length direction of the top arm 113 and preferably is configured to be rotated by an actuator (not shown) so as to move between the action position and the retract position.

The structure of the first hook 114 is not limited to the illustrated structure as long as the first hook 114 is capable of moving between the action position protruding toward the article 200 so as to engage with an end of the article 200 and the retract position not contacting with the article 200.

The second hook 115 is attached to an end of the top arm 113 and is configured to move between the action position protruding toward the article 200 and the retract position not contacting with the article 200.

For instance, similarly to the first hook 114, the second hook 115 is attached to a rotation shaft disposed along the length direction of the top arm 113 and preferably is configured to be rotated by an actuator (not shown) so as to move between the action position and the retract position. A common rotation shaft and common actuator is preferably used for the first hook 114 and the second hook 115.

The structure of the second hook 115 is not limited to the illustrated structure as long as the second hook 115 is capable of moving between the action position protruding toward the article 200 so as to engage with an end of the article 200 and the retract position not contacting with the article 200.

The pair of slide arms 110 are configured to be moved by a driver (not shown) to slide integrally or synchronously with each other relative to the placed article 200.

The top arm 113 includes a first end detection sensor 116A, 116B (an example of the end detector) disposed close to the first hook 114 so as to detect the end of the article 200. The first end detection sensor 116A, 116B is a sensor configured to detect that the end position of the article 200 has reached a position at which the first hook 114 engages in the sliding direction of the slide arm 110. More specifically, the first end detection sensor 116A, 116B detects the end position of the article 200 when the position in the sliding direction is identical or close to the end position of the article 200, and therefore is attached to a position adjacent to the first hook 114.

When a transparent type optical sensor is used as the first end detection sensor 116A, 116B, one is a light emitting element while the other is a light receiving element. In addition, it is also possible to use a diffuse reflection type optical sensor as the first end detection sensor, for example.

Using a transparent type optical sensor as the first end detection sensor 116A, 116B, when the slide arm 110 is moved to slide, the first end detection sensor 116A, 116B detects a position at which the light receiving element changes its state from a light receiving state to a non-light receiving state and a position at which the light receiving element changes its state from the non-light receiving state to the light receiving state, as an end of the article 200 on the elevation table 316 side or an end thereof on the shelf 302 side.

The top arm 113 is provided with a second end detection sensor 117A, 117B disposed adjacent to the second hook 115 so as to detect the end of the article 200.

The second end detection sensor 117A, 117B is a sensor configured to detect that the end position of the article 200 has reached a position at which the second hook 115 engages in the sliding direction of the slide arm 110. More specifically, the second end detection sensor 117A, 117B detects the end position of the article 200 when the position in the sliding direction is identical or close to the end position of the article 200, and therefore is attached to a position adjacent to the second hook 115.

Similarly to the first end detection sensor 116A, 116B, a transparent type optical sensor is preferably used as the second end detection sensor 117A, 117B. In addition, it is also possible to use a diffuse reflection type optical sensor as the second end detection sensor.

Using a transparent type optical sensor as the second end detection sensor 117A, 117B, when the slide arm 110 is moved to slide, the second end detection sensor 117A, 117B detects a position at which the light receiving element changes its state from a light receiving state to a non-light receiving state and a position at which the light receiving element changes its state from the non-light receiving state to the light receiving state, as the end of the article 200 on the elevation table 316 or the end thereof on the shelf 302 side.

The elevation table 316 is provided with a conveyor 121 capable of transporting the placed article 200 in parallel or substantially parallel to the moving direction of the slide arm 110. The conveyor 121 supports the article 200 placed on the top surface and is driven by a conveyor actuator (not shown) so as to transport the article 200 in the direction of pushing out toward the shelf 302 or pulling from the shelf 302 in parallel or substantially parallel to the moving direction of the slide arm 110.

Figure 5:
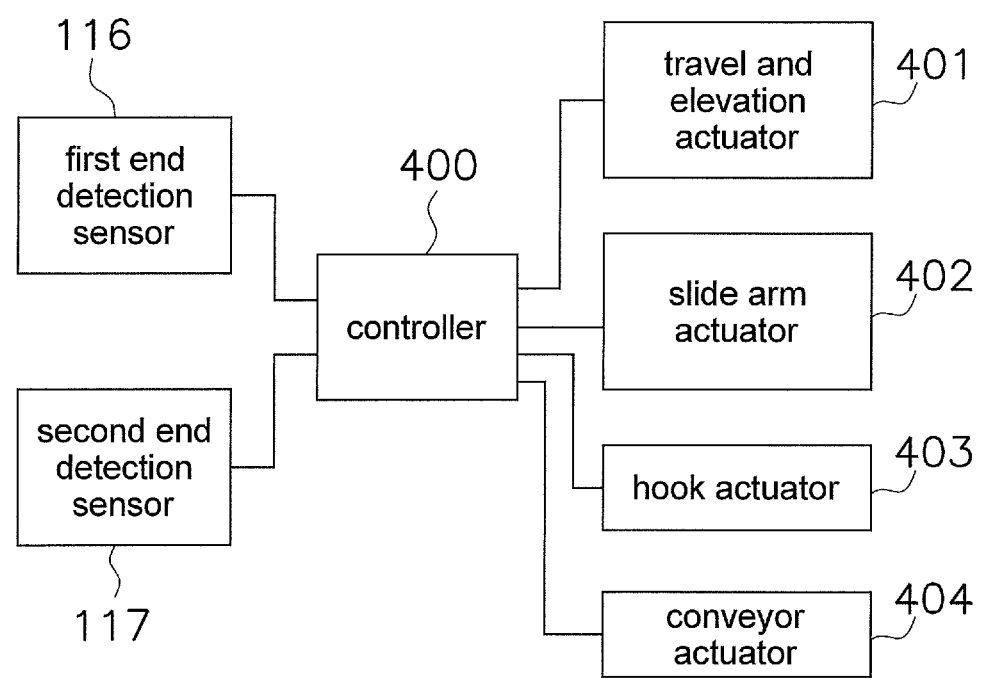
FIG. 5 is a control block diagram of the first preferred embodiment of the present invention.

FIG. 5 is a control block diagram of the first preferred embodiment.

The transfer device 100 includes a controller 400 configured or programmed to control individual units. The controller 400 preferably includes a microprocessor including a CPU, a ROM, a RAM, and the like, for example.

The controller 400 is connected to a slide arm actuator 402 to move the slide arm 110 to slide relative to the shelf 302.

In addition, the controller 400 is connected to a hook actuator 403 to move the first hook 114 and the second hook 115 attached to the slide arm 110 between the action position and the retract position.

Further, the controller 400 is connected to a conveyor actuator 404 to drive the conveyor 121 in accordance with a direction of transferring the article 200.

In addition, the controller 400 is connected to the first end detection sensor 116 and the second end detection sensor 117 so as to receive detection signals from the sensors.

If the transfer device 100 is included in the stacker crane 301, the controller 400 also controls each unit of the stacker crane 301. In this case, for example, the controller 400 is connected to a travel and elevation actuator 401, which moves a main body portion including the lower cart 311 and the upper cart 312 connected by the mast 313 to travel along the traveling rail, and moves the elevation table 316 up and down to a position to transfer among the multiple shelves 302.

Figure 6:
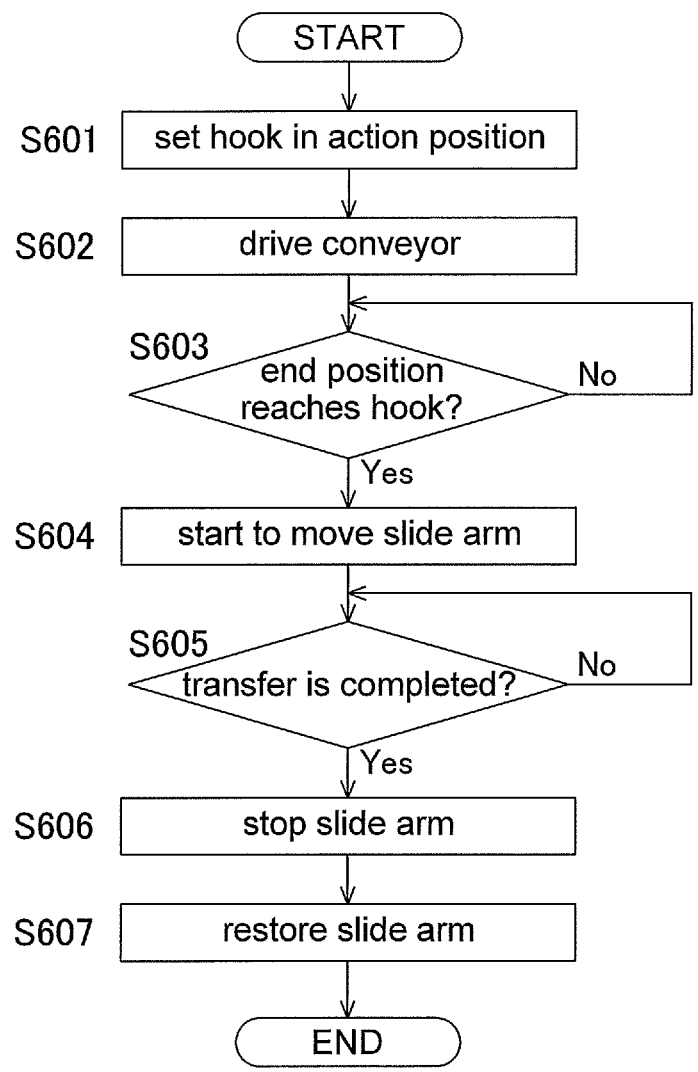
FIG. 6 is a control flowchart of the first preferred embodiment of the present invention.

FIG. 6 is a control flowchart of the first preferred embodiment.

Here, an operation when transferring the article 200 placed on the elevation table 316 of the transfer device 100 to the shelf 302 is described.

In Step S601, the controller 400 transmits a control signal to the hook actuator 403 so as to set the hook for pushing out the article 200 toward the shelf 302 in the action position. As shown in FIGS. 3A and 3B, when transferring the article 200 from the elevation table 316 to the shelf 302 positioned on the left side, the second hook 115 positioned on the rear side in the transferring direction is set to the action position. Thus, the second hook 115 is capable of contacting with the end position of the article 200.

In Step S602, the controller 400 transmits a control signal to the conveyor actuator 404 so as to drive the conveyor 121 to transport the article 200 oppositely to the article transporting direction. Here, to transport the article 200 placed on the elevation table 316 of the transfer device 100 to the shelf 302, the direction from right to left is the transporting direction of the article 200 in FIG. 3A and FIG. 4A, and the direction from left to right is the opposite direction of the transporting direction of the article 200 in FIG. 3A and FIG. 4A.

For instance, the conveyor 121 is driven from the state where the article 200 is placed in the position shown by a dot-dashed line in FIG. 4A, and the article 200 is moved to the position where the end position of the article 200 on the opposite side in the article transporting direction contacts with the second hook 115 (the position of the article 200 shown by a solid line in the diagram).

In Step S603, the controller 400 determines whether or not the end position of the article 200 on the opposite side in the article transporting direction has reached the position of the second hook 115.

For instance, it is supposed that the second end detection sensor 117A, 117B includes a transparent type optical sensor and is disposed adjacent to the second hook 115. When the light receiving element of the second end detection sensor 117A, 117B changes its state from the light receiving state to the non-light receiving state, it is determined that the end position of the article 200 on the opposite side in the article transporting direction has reached the position of the second end detection sensor 117A, 117B. After that, the conveyor 121 moves the article 200 by the amount corresponding to a gap between the position of the second end detection sensor 117A, 117B and the second hook 115, so that the end position of the article 200 is able to contact with the second hook 115.

In addition, it is also possible to detect in advance a position at which the article 200 is placed, and to drive the conveyor 121 for a predetermined time so that the end position of the article 200 on the opposite side in the article transporting direction reaches the second hook 115.

The controller 400 maintains the driving state of the conveyor 121 until the end position of the article 200 contacts with the hook, and proceeds to Step S604 if it is determined that the end position of the article 200 has contacted with the hook.

In Step S604, the controller 400 stops to drive the conveyor 121 and starts the movement of the slide arm 110.

The controller 400 transmits a control signal to the conveyor actuator 404 and stops to transport the article 200 oppositely to the article transporting direction. In addition, the controller 400 transmits a control signal to the slide arm actuator 402 so as to start the movement of the slide arm 110 toward the shelf 302 in the state where the second hook 115 contacts with the end position of the article 200.

In addition, the controller 400 is configured or programmed to start the movement of the conveyor 121 in the transporting direction simultaneously with or a little after the start of the movement of the slide arm 110.

In Step S605, the controller 400 determines whether or not the transfer of the article 200 by the slide arm 110 has been completed. If the slide arm actuator 402 includes a stepping motor with a servo mechanism, the controller 400 determines that the transfer of the article 200 to the shelf 302 is completed in accordance with the number of drive pulses. In addition, it is possible to dispose a sensor configured to detect the front end position of the slide arm 110, so that the controller 400 is able to determine whether or not the slide arm 110 has reached a predetermined position on the shelf 302 based on a detection signal from the sensor.

The controller 400 maintains the moving state of the slide arm 110 until determining that the transfer of the article 200 is completed, and proceeds to Step S606 if it is determined that the transfer of the article 200 is completed.

In Step S606, the controller 400 stops the slide arm 110. The controller 400 transmits a control signal to the slide arm actuator 402 so as to finish the slide movement of the slide arm 110. If the conveyor 121 is simultaneously driven, the controller 400 transmits a control signal to the conveyor actuator 404 so as to stop the drive of the conveyor 121.

In Step S607, the controller 400 transmits a control signal to the hook actuator 403 so as to move the second hook 115 to the retract position, and transmits a control signal to the slide arm actuator 402 so as to restore the slide arm 110 to an initial position.

In the transfer device 100 of the first preferred embodiment as described above, when transferring the article 200 placed on the elevation table 316 to the shelf 302, the conveyor 121 moves the article 200 in advance oppositely to the article transporting direction so that the end position of the article 200 contacts with the second hook 115, and afterwards the movement of the slide arm 110 in the transporting direction is started. Therefore, when starting the movement of the slide arm 110, the second hook 115 contacts with the end position of the article 200 on the opposite side in the article transporting direction, and the slide arm actuator 402 drives the slide arm 110 at high speed from the beginning. Therefore, it is possible to significantly reduce the time of the transfer process of the article 200 from the elevation table 316 to the shelf 302.

Second Preferred Embodiment

Figure 7:
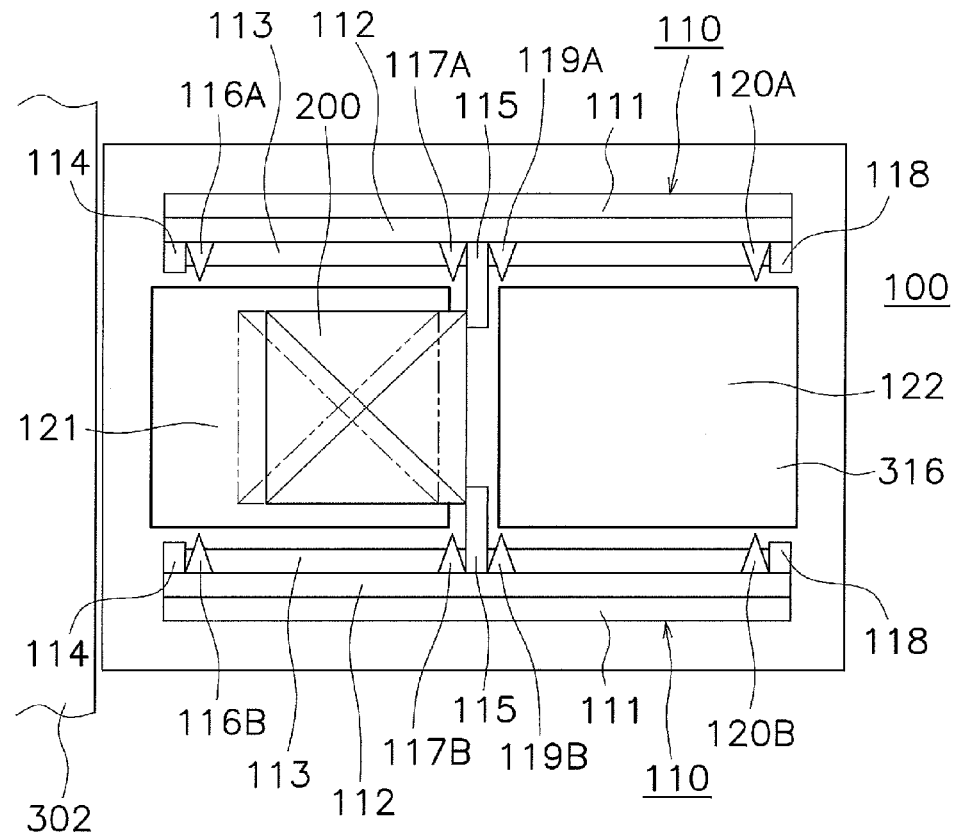
FIG. 7 is an explanatory diagram of the transfer device 100 according to a second preferred embodiment of the present invention.

FIG. 7 is an explanatory diagram of the transfer device 100 of the second preferred embodiment of the present invention.

In the second preferred embodiment, there is shown the transfer device 100 capable of simultaneously transferring two articles 200A and 200B placed in series in the moving direction of the slide arm 110, in which the same elements and portions as in the first preferred embodiment are denoted by the same reference numeral.

The transfer device 100 is a device configured to transfer the article 200 between the elevation table 316 and the shelf 302, and is equipped with a pair of slide arms 110.

The pair of slide arms 110 are disposed with a space between them in the second horizontal direction. Each slide arm 110 includes the base arm 111, the middle arm 112, the top arm 113, the first hook 114, the second hook 115, and a third hook 118.

The base arm 111 is secured to the elevation table 316. The middle arm 112 is supported by the base arm 111 in a slidable manner in the first horizontal direction, and supports the top arm 113 in a slidable manner in the first horizontal direction. When the middle arm 112 and the top arm 113 are moved to slide relative to the base arm 111, the top arm 113 is capable of being inserted into the shelves 302 on both sides.

The first hook 114 is attached to the end of the top arm 113 and is configured to move between the action position protruding toward the article 200 and the retract position not contacting with the article 200.

For instance, the first hook 114 is attached to a rotation shaft disposed along a length direction of the top arm 113 and preferably is configured to be rotated by an actuator (not shown) so as to move between the action position and the retract position.

The structure of the first hook 114 is not limited to the illustrated structure as long as the first hook 114 is capable of moving between the action position protruding toward the article 200 so as to engage with an end of the article 200 and the retract position not contacting with the article 200.

The second hook 115 is attached so as to be positioned at a middle portion of the top arm 113 in the first horizontal direction, and preferably is configured to move between the action position protruding toward the article 200 and the retract position not contacting with the article 200.

For instance, similarly to the first hook 114, the second hook 115 is attached to a rotation shaft disposed along the length direction of the top arm 113 and preferably is configured to be rotated by an actuator (not shown) so as to move between the action position and the retract position. A common rotation shaft and common actuator preferably are used for the first hook 114 and the second hook 115.

The structure of the second hook 115 is not limited to the illustrated structure as long as the second hook 115 is capable of moving between the action position protruding toward the article 200 so as to engage with an end of the article 200 and the retract position not contacting with the article 200.

The third hook 118 is attached to the end of the top arm 113 and preferably is configured to move between the action position protruding toward the article 200 and the retract position not contacting with the article 200.

For instance, similarly to the first hook 114, the second hook 115 is attached to a rotation shaft disposed along the length direction of the top arm 113 and preferably is configured to be rotated by an actuator (not shown) so as to move between the action position and the retract position. A common rotation shaft and common actuator preferably are used for the first hook 114, the second hook 115, and the third hook 118.

The structure of the third hook 118 is not limited to the one shown in the pulling as long as the third hook 118 is capable of moving between the action position protruding toward the article 200 so as to engage with the end of the article 200 and the retract position not contacting with the article 200.

The pair of slide arms 110 preferably are configured to be moved by a driver (not shown) to slide integrally or synchronously with each other relative to the placed article 200.

The top arm 113 includes a first end detection sensor 116A, 116B (an example of the end detector) disposed close to the first hook 114 so as to detect the end of the article 200. The first end detection sensor 116A, 116B is a sensor configured to detect that the end position of the article 200 has reached a position at which the first hook 114 can engage in the sliding direction of the slide arm 110. More specifically, the first end detection sensor 116A, 116B detects the end position of the article 200 when the position in the sliding direction is identical or close to the end position of the article 200, and therefore is attached to a position adjacent to the first hook 114.

When a transparent type optical sensor is used as the first end detection sensor 116A, 116B, one is a light emitting element while the other is a light receiving element, for example. In addition, it is also possible to use a diffuse reflection type optical sensor as the first end detection sensor.

Using a transparent type optical sensor as the first end detection sensor 116A, 116B, when the slide arm 110 is moved to slide, the first end detection sensor 116A, 116B detects a position at which the light receiving element changes its state from a light receiving state to a non-light receiving state, and a position at which the light receiving element changes its state from the non-light receiving state to the light receiving state, respectively as the end positions of the article 200.

The top arm 113 is provided with the second end detection sensor 117A, 117B and a third end detection sensor 119A, 119B disposed adjacent to the second hook 115 so as to detect the end of the article 200.

The second end detection sensor 117A, 117B and the third end detection sensor 119A, 119B are sensors configured to detect that the end position of the article 200 has reached a position where the second hook 115 is able to engage in the sliding direction of the slide arm 110. More specifically, the second end detection sensor 117A, 117B and the third end detection sensor 119A, 119B detect the end position of the article 200 when the position in the sliding direction is identical or close to the end position of the article 200, and therefore is attached to the positions adjacent to the second hook 115.

The second end detection sensor 117A, 117B is attached to the side close to the first end detection sensor 116A, 116B in order to detect the end position of the article 200 positioned on the left side of the second hook 115 in FIG. 7. In addition, the third end detection sensor 119A, 119B is attached to the side away from the first end detection sensor 116A, 116B in order to detect the end position of the article 200 positioned on the right side of the second hook 115 in FIG. 7.

Similarly to the first end detection sensor 116A, 116B, a transparent type optical sensor preferably is used for the second end detection sensor 117A, 117B and the third end detection sensor 119A, 119B. In addition, it is also possible to use a diffuse reflection type optical sensor as the second end detection sensor and the third end detection sensor.

Using a transparent type optical sensor as the second end detection sensor 117A, 117B and the third end detection sensor 119A, 119B, when the slide arm 110 is moved to slide, the second end detection sensor 117A, 117B and the third end detection sensor 119A, 119B respectively detect a position at which the light receiving element changes its state from a light receiving state to a non-light receiving state and a position at which the light receiving element changes its state from the non-light receiving state to the light receiving state, as the end positions of the article 200.

The top arm 113 is provided with a fourth end detection sensor 120A, 120B disposed adjacent to the third hook 118 so as to detect the end of the article 200.

The fourth end detection sensor 120A, 120B is a sensor configured to detect that the end position of the article 200 has reached the position where the third hook 118 can engage in the sliding direction of the slide arm 110. More specifically, the fourth end detection sensor 120A, 120B detects the end position of the article 200 when the position in the sliding direction is identical or close to the end position of the article 200, and therefore is attached to the position adjacent to the third hook 118.

Similarly to the first end detection sensor 116A, 116B, a transparent type optical sensor preferably is used as the fourth end detection sensor 120A, 120B. In addition, it is also possible to use a diffuse reflection type optical sensor as the fourth end detection sensor.

Using a transparent type optical sensor as the fourth end detection sensor 120A, 120B, when the slide arm 110 is moved to slide, the fourth end detection sensor 120A, 120B detects a position at which the light receiving element changes its state from a light receiving state to a non-light receiving state and a position at which the light receiving element changes its state from the non-light receiving state to the light receiving state, as the end positions of the article 200.

The elevation table 316 is provided with the first conveyor 121 and a second conveyor 122 disposed in series in the moving direction of the slide arm 110. The article 200 preferably is placed on each of the first conveyor 121 and the second conveyor 122, which are driven by a driver (not shown) so as to pass the article 200 interactively.

Figure 8:
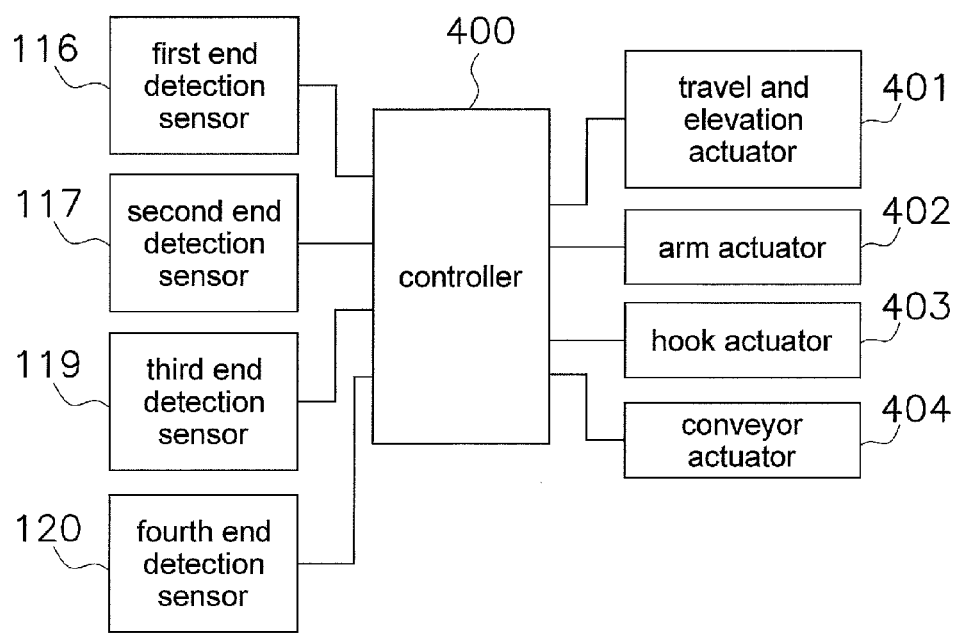
FIG. 8 is a control block diagram in the second preferred embodiment of the present invention.

FIG. 8 is a control block diagram of the second preferred embodiment.

The transfer device 100 includes the controller 400 configured or programmed to control individual units. The controller 400 preferably includes a microprocessor including a CPU, a ROM, a RAM, and the like, for example.

The controller 400 is connected to the slide arm actuator 402 to move the slide arm 110 to slide relative to the shelf 302.

In addition, the controller 400 is connected to the hook actuator 403 to move the first hook 114, the second hook 115, and the third hook 118 attached to the slide arm 110 between the action position and the retract position.

Further, the controller 400 is connected to the conveyor actuator 404 to drive the first conveyor 121 and the second conveyor 122 in accordance with a direction of transferring the article 200.

In addition, the controller 400 is connected to the first end detection sensor 116, the second end detection sensor 117, the third end detection sensor 119, and the fourth end detection sensor 120 so as to receive detection signals from the sensors.

If the transfer device 100 is included in the stacker crane 301, the controller 400 also preferably controls each unit of the stacker crane 301. In this case, for example, the controller 400 is connected to the travel and elevation actuator 401, which moves a main body portion including the lower cart 311 and the upper cart 312 connected by the mast 313 to travel along the traveling rail, and moves the elevation table 316 up and down to a position to transfer among the multiple shelves 302.

Figure 9:
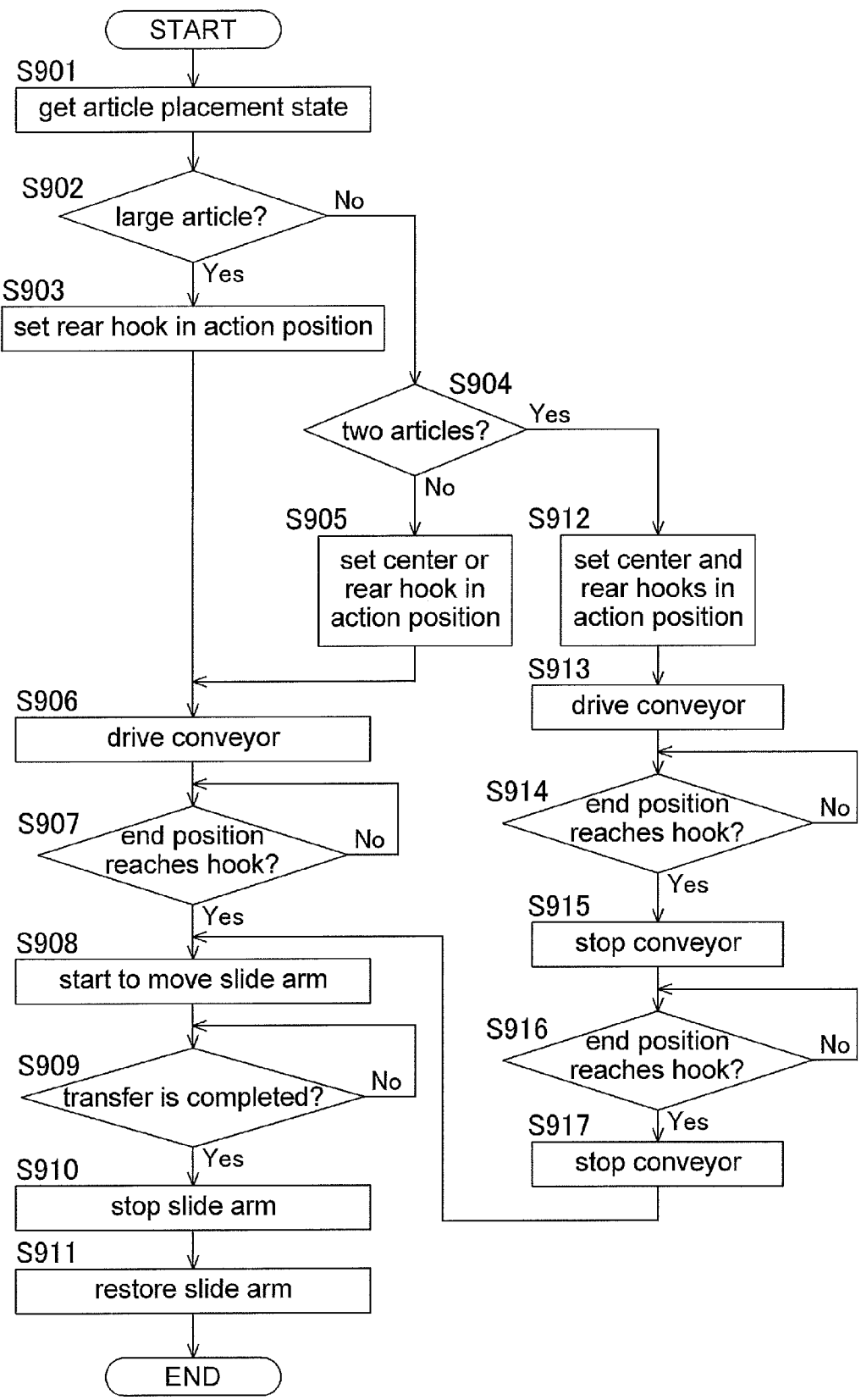
FIG. 9 is a control flowchart of the second preferred embodiment of the present invention.

FIG. 9 is a control flowchart of the second preferred embodiment.

Here, an operation when transferring the article 200 to the shelf 302 positioned on the left side of the elevation table 316 is described. The direction from right to left in FIG. 7 is the article transporting direction, and direction from left to right in FIG. 7 is the opposite direction to the article transporting direction.

In Step S901, the controller 400 perceives the state where the article is placed on the elevation table 316. If the elevation table 316 is provided with sensors configured to detect the state where the article is placed on the first conveyor 121 or the second conveyor 122, the controller 400 obtains data about the state where the article is placed on the first conveyor 121 or the second conveyor 122 based on a detection signal of a corresponding sensor.

There are states where the article is placed on the elevation table 316, including, for example, the state where the article 200 is not placed on the first conveyor 121 or the second conveyor 122, the state where the article 200 is placed on only one of the first conveyor 121 and the second conveyor 122, the state where the articles 200A and 200B are respectively placed on the first conveyor 121 and the second conveyor 122, and a large article is placed over the first conveyor 121 and the second conveyor 122.

It is possible to dispose a plurality of transparent type or diffuse reflection type optical sensors on a side of the elevation table 316 so as to detect whether or not the article is placed on the first conveyor 121 and the second conveyor 122.

In this case, the controller 400 preferably determines one of the above-mentioned article placement states based on detection signals of the sensors disposed on the elevation table 316.

In addition, the controller 400 is configured or programmed to store transfer process data in the past in a predetermined storage area and obtain the article placement state on the elevation table 316 based on the transfer process data. For instance, if the transfer process in which the two articles 200A and 200B were transferred from the station 303 or the shelf 302 is the latest process, the controller 400 determines that the articles 200A and 200B are respectively placed on the first conveyor 121 and the second conveyor 122.

In Step S902, the controller 400 determines whether or not the article 200 is a large article placed over the first conveyor 121 and the second conveyor 122.

Figure 11:
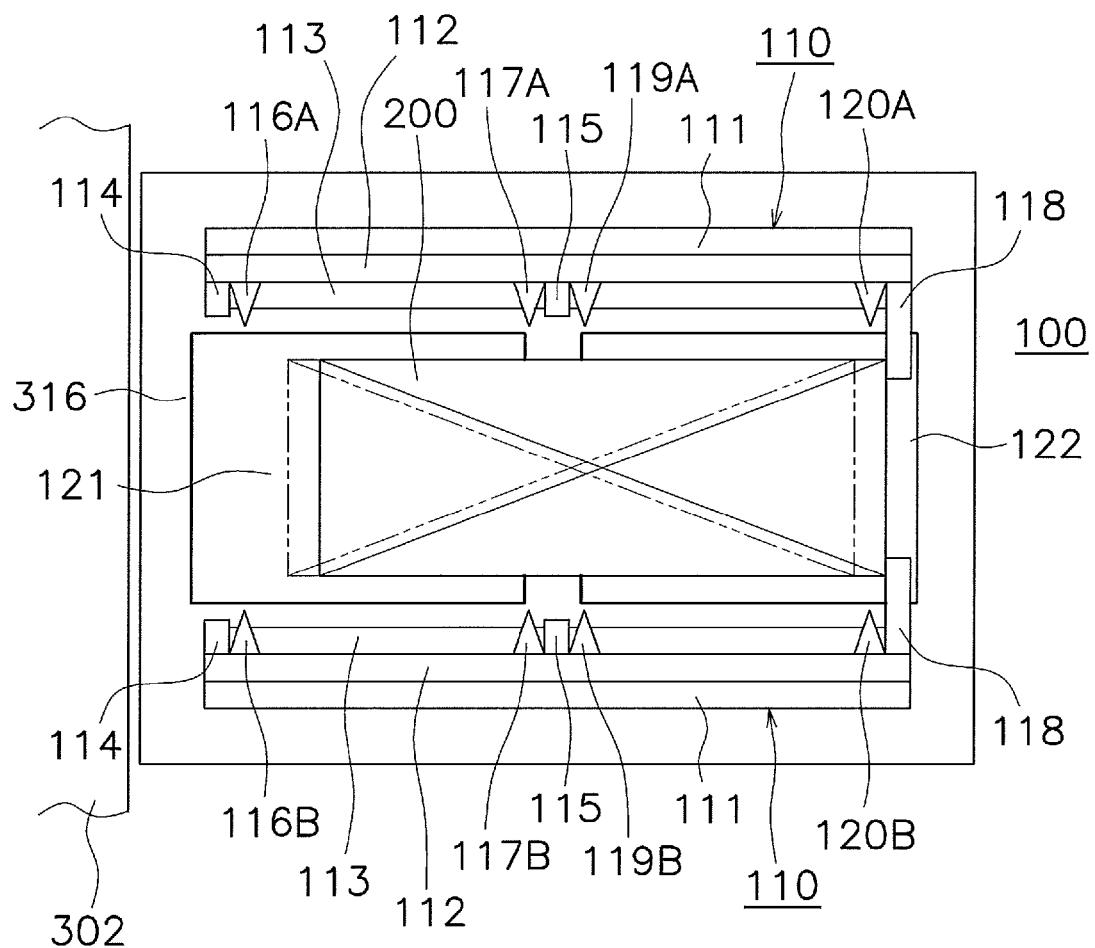
FIG. 11 is an explanatory diagram in the case where an article 200 placed over a first conveyor 121 and a second conveyor 122 disposed on the elevation table 316 is transferred to a shelf 302.

FIG. 11 is an explanatory diagram of the elevation table 316 with the article 200 placed over the first conveyor 121 and the second conveyor 122.

The controller 400 is configured or programmed to determine whether or not the article 200 is placed over the first conveyor 121 and the second conveyor 122 based on a detection signal of a sensor (not shown) disposed on the elevation table 316.

In addition, if an interval between the second end detection sensor 117A, 117B and the third end detection sensor 119A, 119B is set smaller than the minimum interval between the article 200A on the first conveyor 121 and the article 200B on the second conveyor 122, both detection signals of the second end detection sensor 117A, 117B and the third end detection sensor 119A, 119B become the non-light receiving state when the large article 200 is placed over the first conveyor 121 and the second conveyor 122.

Therefore, in this case, if both the second end detection sensor 117A, 117B and the third end detection sensor 119A, 119B are in the non-light receiving state, the controller 400 determines that the article 200 is a large article placed over the first conveyor 121 and the second conveyor 122.

If it is determined that the large article 200 is placed on the elevation table 316, the controller 400 proceeds to Step S903. If it is determined that the large article 200 is not placed on the elevation table 316, the controller 400 proceeds to Step S904.

In Step S903, the controller 400 transmits a control signal to the hook actuator 403 so as to set in the action position the third hook 118 disposed on the rear side in the transporting direction of the article 200. In this case, in order to prevent the article 200 from dropping, it is possible to set the first hook 114 in the action position.

In Step S904, the controller 400 determines whether or not the articles 200A and 200B are placed on both the first conveyor 121 and the second conveyor 122.

If it is determined that the article 200 is placed on only one of the first conveyor 121 and the second conveyor 122 based on the detection signal of the sensor disposed on the elevation table 316 or the transfer process data in the past, the controller 400 proceeds to Step S905. If it is determined that the articles 200A and 200B are placed on both the first conveyor 121 and the second conveyor 122, the controller 400 proceeds to Step S912.

In Step S905, the controller 400 transmits a control signal to the hook actuator 403 so as to set in the action position one of the second hook 115 disposed in the middle and the third hook 118 disposed on the opposite direction to the transporting direction of the article 200.

For instance, if the article 200 is placed on the first conveyor 121, the controller 400 transmits a control signal so that the hook actuator 403 sets the action position of the second hook 115 disposed in the middle. In addition, if the article 200 is placed on the second conveyor 122, the controller 400 transmits a control signal so that the hook actuator 403 sets the action position of the third hook 118 disposed on the opposite side in the article transporting direction. In this case, in order to prevent the article 200 from dropping, it is possible to set in the action position the first hook 114 and/or the second hook 115 disposed on the front side of the article 200.

In Step S906, the controller 400 transmits a control signal to the conveyor actuator 404 and drives the first conveyor 121 and the second conveyor 122 so as to transport the article 200 oppositely to the article transporting direction. If the article 200 is a large article placed over the first conveyor 121 and the second conveyor 122, the controller 400 transmits a control signal to the conveyor actuator 404 so that both the first conveyor 121 and the second conveyor 122 are driven. In addition, if the article 200 has been placed on one of the first conveyor 121 and the second conveyor 122, the controller 400 transmits a control signal to the conveyor actuator 404 so that the corresponding first conveyor 121 or second conveyor 122 is driven.

After that, the process of Steps S907 to S911 is the same as the process of Steps S603 to S607 in the first preferred embodiment, and hence detailed description thereof is omitted.

In Step S912, the controller 400 transmits a control signal to the hook actuator 403 so as to set in the action position the second hook 115 (center hook) disposed on the opposite side in the transporting direction of the article 200A and the third hook 118 (rear hook) disposed on the opposite side in the transporting direction of the article 200B. In this case, in order to prevent the article 200A from dropping, it is possible to set the first hook 114 in the action position.

In Step S913, the controller 400 transmits a control signal to the conveyor actuator 404 and drives the first conveyor 121 and the second conveyor 122 so as to transport the articles 200A and 200B oppositely to the article transporting direction.

In Step S914, the controller 400 determines whether or not the end position of one of the articles 200A and 200B on the opposite side in the article transporting direction has reached the second hook 115 or the third hook 118.

Figure 10:
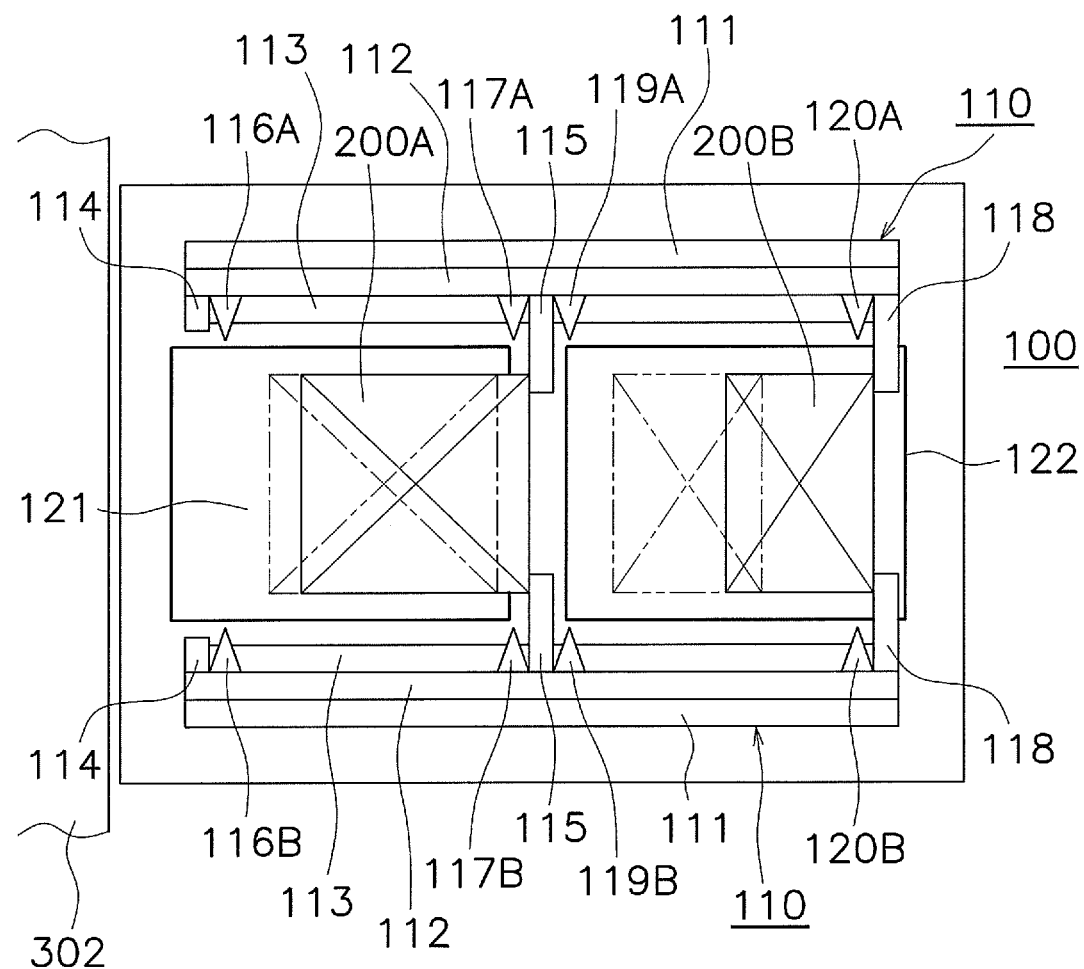
FIG. 10 is an explanatory diagram in the case where two articles 200A and 200B placed on an elevation table 316 are simultaneously transferred.

FIG. 10 is an explanatory diagram when simultaneously transferring the two articles 200A and 200B placed on the elevation table 316.

When the articles 200A and 200B are respectively placed on the first conveyor 121 and the second conveyor 122 disposed on the elevation table 316, reaching time from a placement position to the hook is different depending on placement positions of the articles 200A and 200B and sizes thereof.

For instance, in the example shown in FIG. 10, the distance from the placement position of the article 200A to the second hook 115 is shorter than the distance from the placement position of the article 200B to the third hook 118. Therefore, when the first conveyor 121 and the second conveyor 122 have the same transporting speed, the rear position of the article 200A reaches the second hook 115 first.

In a vicinity of the second hook 115 of the slide arm 110, the second end detection sensor 117A, 117B (the second end detection sensor 117 in FIG. 8) is disposed on the front side of the second hook 115 in the article transporting direction. When a detection signal of a light receiving unit of the second end detection sensor 117A, 117B changes its state from the light receiving state to the non-light receiving state, the controller 400 determines that the end position of the article 200A on the opposite side in the article transporting direction has reached the position of the second end detection sensor 117A, 117B. After that, when the first conveyor 121 further moves the article 200A by the amount corresponding to a gap between the position of the second end detection sensor 117A, 117B and the second hook 115, the end position of the article 200A reaches the second hook 115.

In addition, it is possible to detect in advance the position at which the article 200A is placed and to drive the first conveyor 121 for a predetermined time so that the end position of the article 200A on the opposite side in the article transporting direction reaches the second hook 115.

The controller 400 maintains the driving state of the first conveyor 121 and the second conveyor 122 until the end position of the article 200A reaches the hook, and proceeds to Step S915 if it is determined that the end position of the article 200A has reached the second hook 115.

In Step S915, the controller 400 transmits a control signal to the conveyor actuator 404 so as to stop the one of the first conveyor 121 and the second conveyor 122, which carries the article whose end position has reached the hook.

In the example shown in FIG. 10, when the end position of the article 200A on the first conveyor 121 has reached the second hook 115, the controller 400 transmits a control signal to stop the first conveyor 121 to the conveyor actuator 404.

In Step S916, the controller 400 determines whether or not the end position of the other of the articles 200A and 200B on the opposite side in the article transporting direction has reached the second hook 115 or the third hook 118.

In the example shown in FIG. 10, after the article 200A on the first conveyor 121 has reached the second hook 115, the article 200B on the second conveyor 122 reaches the third hook 118. In a vicinity of the third hook 118 of the slide arm 110, the fourth end detection sensor 120A, 120B (the fourth end detection sensor 120 in FIG. 8) is disposed. When a detection signal of a light receiving element of the fourth end detection sensor 120A, 120B changes its state from the light receiving state to the non-light receiving state, the controller 400 determines that the end position of the article 200B on the opposite side in the article transporting direction has reached the position of the fourth end detection sensor 120A, 120B. After that, when the second conveyor 122 further moves the article 200B by the amount corresponding to a gap between the position of the fourth end detection sensor 120A, 120B and the third hook 118, the end position of the article 200B reaches the third hook 118.

In addition, it is possible to detect in advance the position at which the article 200B is placed and to drive the second conveyor 122 for a predetermined time so that the end position of the article 200B on the opposite side in the article transporting direction reaches the third hook 118.

The controller 400 maintains the driving state of the second conveyor 122 until the end position of the article 200B reaches the third hook 118, and proceeds to Step S917 if it is determined that the end position of the article 200B has reached the third hook 118.

In Step S917, the controller 400 transmits a control signal to the conveyor actuator 404 so as to stop one of the first conveyor 121 and the second conveyor 122 that is driven.

In the example shown in FIG. 10, when the end position of the article 200B on the second conveyor 122 reaches the third hook 118, the controller 400 transmits a control signal to stop the second conveyor 122 to the conveyor actuator 404. After that, the controller 400 proceeds to Step S908.

In Step S908, the controller 400 starts the movement of the slide arm 110.

The controller 400 transmits a control signal to the slide arm actuator 402 so as to move the slide arm 110 toward the shelf 302, in the state where the second hook 115 contacts with the end position of the article 200 while the third hook 118 contacts with the end position of the article 200B.

In addition, the controller 400 starts the movement of the first conveyor 121 and the second conveyor 122 in the transporting direction simultaneously with or a little after the start of the movement of the slide arm 110.

In Step S909, the controller 400 determines whether or not the transfer of the article 200 by the slide arm 110 is completed. If the slide arm actuator 402 includes a stepping motor with a servo mechanism, the controller 400 determines that the transfer of the articles 200A and 200B to the shelf 302 is completed in accordance with the number of drive pulses. In addition, it is possible to dispose a sensor configured to detect the front end position of the slide arm 110, so that the controller 400 determines whether or not, based on a detection signal from the sensor, the slide arm 110 has reached a predetermined position on the shelf 302.

The controller 400 maintains the moving state of the slide arm 110 until determining that the transfer of the articles 200A and 200B is completed, and proceeds to Step S910 if it is determined that the transfer of the articles 200A and 200B is completed.

In Step S910, the controller 400 stops the slide arm 110. The controller 400 transmits a control signal to the slide arm actuator 402 so as to finish the slide movement of the slide arm 110. When the first conveyor 121 and the second conveyor 122 are simultaneously driven, the controller 400 transmits a control signal to the conveyor actuator 404 so as to stop to drive the first conveyor 121.

In Step S911, the controller 400 transmits a control signal to the hook actuator 403 so as to move the first hook 114, the second hook 115, and the third hook 118 to the retract position, and transmits a control signal to the slide arm actuator 402 so as to restore the slide arm 110 to the initial position.

In the transfer device described above according to the second preferred embodiment, the first conveyor 121 and the second conveyor 122 disposed on the elevation table 316 are used so that the end position of the article 200, 200A, or 200B on the opposite side in the article transporting direction contacts with the second hook 115 and the third hook 118 in advance. Thus, the slide arm 110 is moved at high speed from the beginning. Therefore, it is possible to significantly reduce the transfer process time.

In addition, the article placement states of the articles 200A and 200B on the first conveyor 121 and the second conveyor 122 preferably are detected based on the detection signals of the first end detection sensor 116A, 116B, the second end detection sensor 117A, 117B, the third end detection sensor 119A, 119B, and the fourth end detection sensor 120A, 120B disposed adjacent to the first hook 114, the second hook 115, and the third hook 118. Therefore, it is possible to perform the fast transfer process based on the number and the shapes of the articles placed on the first conveyor 121 and the second conveyor 122.

Other Preferred Embodiments

Although the preferred embodiments of the present invention are described above, the present invention is not limited to the preferred embodiments described above. Various modifications can be made within the scope not deviating from the spirit of the present invention. In particular, the preferred embodiments and variations described in this specification can be arbitrarily combined as necessary.

As shown in FIG. 1 and FIG. 2, the structure of the preferred embodiments described above can be adopted also to the automatic warehouse 300 provided with the shelves 302 on both sides of the traveling direction of the stacker crane 301.

For instance, in the example shown in FIGS. 3A, 3B, 4A and 4B, if there is the shelf 302 disposed on the right side in the diagram, the transfer device 100 allows the first hook 114 to contact with the end position of the article 200 and to push the article 200 toward the shelf. In this case, the first conveyor 121 is driven, and the article 200 is moved to the left side in the diagram so that the end position contacts with the first hook 114.

In each of the preferred embodiments described above, the controller (for example, the controller 400) is preferably configured or programmed to commonly perform the following control operations.

The controller controls the conveyor (for example, the first conveyor 121 and the second conveyor 122) to transport the article oppositely to the article transporting direction until the hook (for example, the second hook 115, the third hook 118) contacts with the end position of the article (for example, the article 200) (for example, Step S602, Step S902).

The controller controls the slide arm (for example, the slide arm 110) to move in the article transporting direction (for example, toward the shelf 302).

In this transfer device, when the hook disposed on the slide arm transfers the article toward the shelf, the conveyor sets in advance the end position of the article on the opposite side in the article transporting direction to contact with the hook. In the transfer process by the slide arm, it is possible to drive the slide arm at high speed from the beginning (for example, Step S604, Step S904). Therefore, it is possible to shorten the transfer process time in the transfer device.

Preferred embodiments of the present invention preferably are capable of being applied to a transfer device to transfer an article in a stacker crane of an automatic warehouse or a station of an automated transport system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transfer device comprising:
a conveyor configured to transport an article placed on a top surface thereof in parallel or substantially parallel with an article transporting direction;
a slide arm configured to slide in parallel or substantially parallel with the article transporting direction;
a hook attached to the slide arm and configured to move between an action position protruding toward an article placed on the conveyor in a direction crossing a sliding direction of the slide arm and a retract position to avoid contact with the article placed on the conveyor; and
a controller configured or programmed to allow the conveyor to transport the article in an opposite direction of the article transporting direction so that an end position of the article in the opposite direction of the article transporting direction reaches a position adjacent to the hook, and then to allow the slide arm to move in the article transporting direction.

2. The transfer device according to claim 1, wherein the controller is configured or programmed to allow the conveyor to start to transport the article in the article transporting direction at a same time or after a start of movement of the slide arm, after the hook contacts with the end position of the article.

3. The transfer device according to claim 1, further comprising an end detecting sensor attached to the slide arm near the hook, wherein
the controller is configured or programmed to determine whether or not an end position of the article in the opposite direction of the article transporting direction reaches a position adjacent to the hook based on a signal detected by the end detecting sensor.

4. The transfer device according to claim 2, further comprising an end detecting sensor attached to the slide arm near the hook, wherein
the controller is configured or programmed to determine whether or not the hook contacts with the end position of the article based a signal detected by the end detecting sensor.

5. A transfer device comprising:
a first conveyor and a second conveyor arranged in series in an article transporting direction, and configured to transport an article placed on a top surface thereof in parallel or substantially parallel with the article transporting direction;
a slide arm configured to slide in parallel or substantially parallel with the article transporting direction;
a first hook and a second hook attached to the slide arm, each of the first hook and the second hook configured to move between an action position protruding toward an article placed on the first conveyor and the second conveyor in a direction crossing a sliding direction of the slide arm and a retract position to avoid contact with the article placed on the first conveyor and the second conveyor;
a first end detecting sensor and a second end detecting sensor attached to the slide arm so as to detect end positions of the articles placed on the first conveyor and the second conveyor respectively in a sliding direction of the slide arm; and
a controller configured or programmed to determine states of the article placed on the first conveyor and the second conveyor based on a result detected by the first end detecting sensor and the second end detecting sensor, and to allow the first conveyor and/or the second conveyor to move an article in an opposite direction of the article transporting direction so that an end position of the article placed on the first conveyor and/or the second conveyor in the opposite direction of the article transporting direction reaches a position adjacent to the first hook and/or the second hook, and then to move the slide arm in the article transporting direction.

6. The transfer device according to claim 5, wherein the controller is configured or programmed to determine, based on a result detected by the first end detecting sensor and the second end detecting sensor, whether no article is placed on the first conveyor or the second conveyor, an article is placed on either the first conveyor or the second conveyor, an article is placed on the first conveyor and an article is placed on the second conveyor, or a large article is placed straddling the first conveyor and the second conveyor.

7. The transfer device according to claim 6, wherein
if it is determined that no article is placed on the first conveyor or second conveyor, the controller finishes a transport process of the article;
if it is determined that an article is placed on either the first conveyor or the second conveyor, the controller is configured or programmed to allow one hook corresponding to one of the first conveyor and the second conveyor on which the article is placed to move to an action position, and to allow the one conveyor to transport the article in an opposite direction of the article transporting direction until an end of the article placed on the conveyor in the opposite direction of the article transporting direction reaches a position adjacent to the hook;
if it is determined that an article is placed on the first conveyor and an article is placed on the second conveyor, the controller is configured or programmed to allow the first hook and the second hook to move to action positions, and to allow the first conveyor and the second conveyor to transport articles in the opposite direction of the article transporting direction until end positions of the articles placed on the first conveyor and the second conveyor in the opposite direction of the article transporting direction reach a position adjacent to the first hook and the second hook respectively; and
if it is determined that a large article is placed straddling the first conveyor and the second conveyor, the controller is configured or programmed to move one of the first hook and the second hook arranged on the end side in the transport direction of the article transport to an action position, and to allow the first conveyor and the second conveyor to transport the article in the opposite direction of the article transporting direction until the end of the article in the opposite direction of the article transporting direction reaches a position adjacent to the hook.

8. The transfer device according to claim 7, wherein
the first end detecting sensor and the second end detecting sensor are attached to the slide arm near the first hook and the second hook, respectively; and
the controller is configured or programmed to determine whether or not the end position of the article in the opposite direction of the article transporting direction, placed on the first conveyor and/or the second conveyor, contacts with the first hook and/or the second hook based on signals detected by the first end detecting sensor and the second end detecting sensor.

* * * * *